(12) United States Patent
Book et al.

(10) Patent No.: US 10,644,341 B2
(45) Date of Patent: May 5, 2020

(54) REMOTELY-DEPLOYED BENTHIC MICROBIAL FUEL CELL

(71) Applicant: The Government of the United States of America, as represented by the Secretary of the Navy, Arlington, VA (US)

(72) Inventors: Jeffrey W. Book, Slidell, LA (US); Leonard M. Tender, Bethesda, MD (US); Joel P. Golden, Fort Washington, MD (US); Andrew J. Quaid, New Orleans, LA (US); Ian Martens, New Orleans, LA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 125 days.

(21) Appl. No.: 16/143,076

(22) Filed: Sep. 26, 2018

(65) Prior Publication Data

US 2019/0097250 A1   Mar. 28, 2019

Related U.S. Application Data

(60) Provisional application No. 62/563,267, filed on Sep. 26, 2017.

(51) Int. Cl.
   *H01M 8/16*     (2006.01)
   *B63B 21/00*    (2006.01)
   *B63B 35/44*    (2006.01)

(52) U.S. Cl.
   CPC .............. *H01M 8/16* (2013.01); *B63B 21/00* (2013.01); *B63B 35/44* (2013.01); *B63B 2021/003* (2013.01); *B63B 2035/4466* (2013.01); *H01M 2250/20* (2013.01)

(58) Field of Classification Search
   None
   See application file for complete search history.

(56) References Cited

U.S. PATENT DOCUMENTS

| 8,916,299 B1 | 12/2014 | Liu et al. |
| 9,484,589 B1 | 11/2016 | Hsu et al. |
| 9,660,286 B1 | 5/2017 | McNeilly |
| 2015/0249257 A1 | 9/2015 | Liu et al. |
| 2015/0357666 A1 | 12/2015 | Arias-Thode et al. |

OTHER PUBLICATIONS

International Search Report and Opinion dated Jan. 30, 2019 in PCT/US2018/052955.

*Primary Examiner* — Eli S Mekhlin
(74) *Attorney, Agent, or Firm* — US Naval Research Laboratory; Roy Roberts

(57) ABSTRACT

A remotely-deployed benthic microbial fuel cell is provided, as well as a method for deploying the benthic microbial fuel cell. The remotely-deployed benthic microbial fuel cell has a mooring that includes a base unit, and a plurality of flukes mounted to a perimeter of a bottom portion of the base unit, the plurality of flukes being preconfigured to automatically move from a stored position to a deployed position. The benthic microbial fuel cell includes an anode that is mounted to the bottom portion of the base unit, and isolated from oxygenated water in an anoxic chamber by the plurality of flukes when in the deployed position. The benthic microbial fuel cell further includes a cathode that is attached to the base unit outside the anoxic chamber, where the cathode stays in oxygenated water when the remotely-deployed bottom mooring is deployed.

11 Claims, 10 Drawing Sheets

REMOTELY-DEPLOYED BENTHIC MICROBIAL FUEL CELL

CROSS-REFERENCE TO RELATED APPLICATIONS

This Application is a non-provisional application claiming priority to U.S. Provisional Application No. 62/563,267, filed on Sep. 26, 2017, under 35 U.S.C. § 119(e). The entire disclosure of the provisional application is incorporated herein by reference.

BACKGROUND OF THE INVENTION

A major focus of oceanographic research expected over the next several decades is on the space/time variability of physical and bio-optical processes observed through in situ and remote sensing techniques, and modeling these physical and bio-optical processes. Tools to measure a large suite of ocean parameters, in real-time, over long periods, to facilitate algorithm development, relate bio-optical and physical phenomena, and incorporate phenomena into ocean models will be needed. A continuous, long-term record could be needed to resolve the small-to-fine scale spatial and temporal processes operating on the shelf transition zone and in the coastal zone, for example, but not limited to, wind events, sediment re-suspension and transport, tidal effects, long-shore currents, and offshore current intrusions.

Long-term deployments (multiple months to multiple years) of seafloor-mounted electronics are common practice for obtaining such data on oceanographic, geological, and biological processes; monitoring of natural resource harvesting; and Naval and defense monitoring and communication. These systems should be self-powered in all cases except relatively uncommon situations when the area of interest is accessible, such as locations near a shoreline or cabled observatory. Traditionally, this power has come from conventional stored chemical batteries. Proposals for self-power generation involving mechanical transfer of ocean energy through moving apparatus and rotary electrical generators run a high risk of failure due to bio-fouling of the moving parts. Benthic microbial fuels cells (BMFCs) are a non-mechanical method for generating power that use a biochemical process to develop a voltage potential across electrodes in the seafloor sediment and in the free stream seawater, respectively. One example of a BMFC is described in U.S. Pat. No. 8,012,616, the entire contents of which are incorporated herein by reference. These systems show promise in developing consistent, long-term power generation. Development of successful benthic microbial fuel cells has so far been limited to diver and remotely operated underwater vehicle (ROV) installed systems and arrays.

SUMMARY OF THE INVENTION

The invention described herein, including the various aspects and/or embodiments thereof, meets the unmet needs of the art, as well as others, by providing a remotely-deployed benthic microbial fuel cell, as well as a method for deploying the benthic microbial fuel cell.

In one aspect of the invention, a remotely-deployed bottom mooring includes a base unit; a plurality of flukes that are mounted to a perimeter of a bottom portion of the base unit, the plurality of flukes are preconfigured to automatically move from a stored position to a deployed position, each fluke of the plurality of flukes is adjacent to a side portion of the base unit when in the stored position, and each fluke of the plurality of flukes overlaps an adjacent fluke on a bottom of a body of water when in the deployed position; a benthic microbial fuel cell, further comprising: an anode that is mounted to the bottom portion of the base unit, the anode is: embedded in the bottom of the body of water when the self-embedded bottom mooring is deployed, and isolated from oxygenated water in an anoxic chamber by the plurality of flukes when in the deployed position; a cathode that is attached to the base unit outside the anoxic chamber, the cathode floating in the oxygenated water when the remotely-deployed bottom mooring is deployed; and at least one sensor device on a circuit between the anode and the cathode.

In a further aspect of the invention, a method for deploying a benthic microbial fuel cell includes positioning a plurality of flukes of a remotely-deployed benthic microbial fuel cell in a stored position, wherein each fluke of the plurality of flukes is adjacent to a base unit of the remotely-deployed benthic microbial fuel cell when in the stored position; lowering the remotely-deployed benthic microbial fuel cell to a bottom of a body of water; sending a release signal to the remotely-deployed benthic microbial fuel cell, wherein in response to the release signal, the remotely-deployed benthic microbial fuel cell moves from the stored position to a deployed position, and wherein each fluke of the plurality of flukes overlaps an adjacent fluke on the bottom of the body of water when in the deployed position; and performing underwater operations with current generated by the benthic microbial fuel cell, wherein an anode of the benthic microbial fuel cell is isolated from oxygenated water by the plurality of flukes when in the deployed position.

Other features and advantages of the present invention will become apparent to those skilled in the art upon examination of the following or upon learning by practice of the invention.

DETAILED DESCRIPTION

Figure 1:
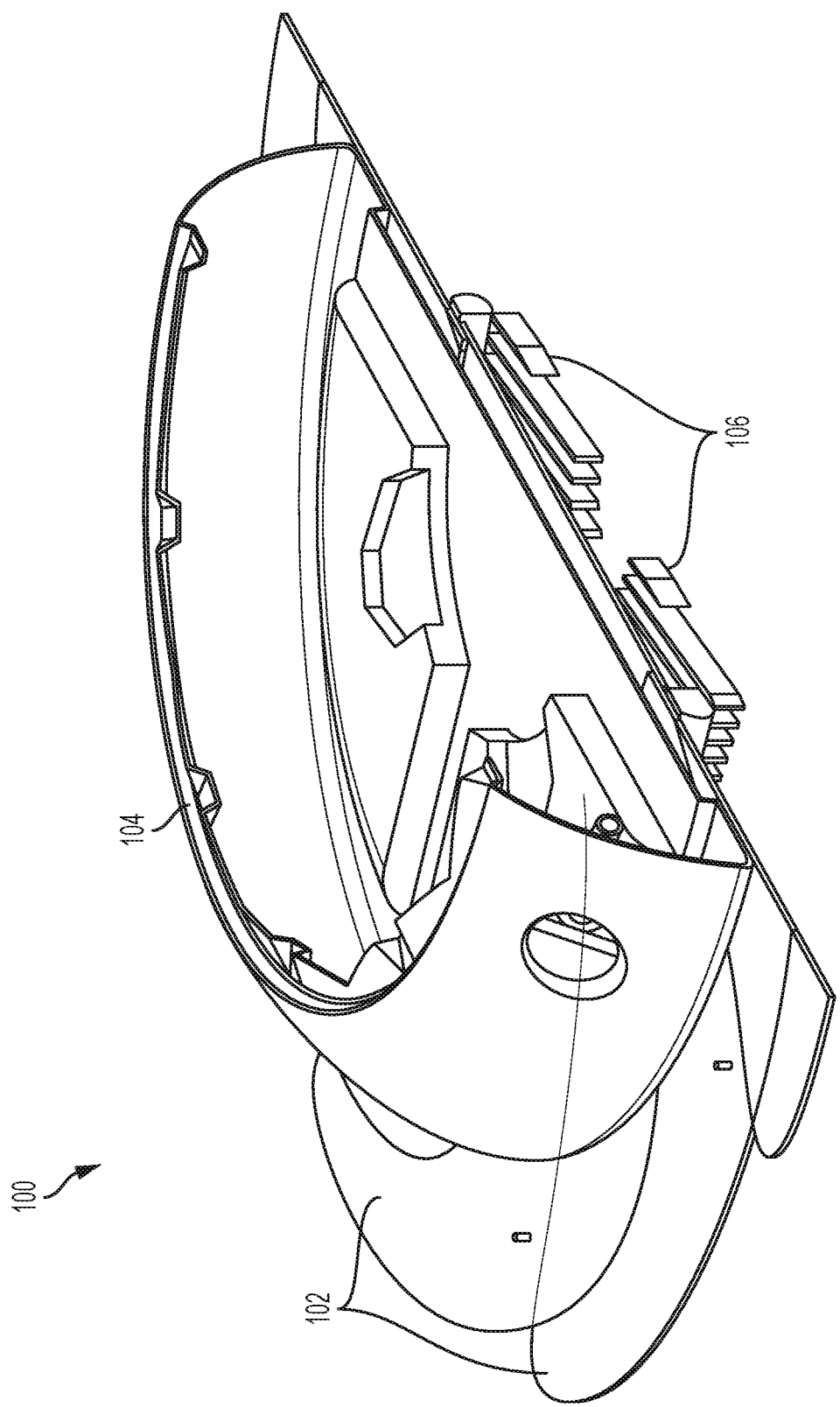
FIG. 1 is a cross-sectional view of an example remotely-deploying benthic microbial fuel cell.

A low cost and easily deployed design is desired in order for the use of benthic microbial fuel cells to be cost effective. Further, benthic microbial fuel cells should prevent oxygen from reaching the anode underneath the mooring because oxygen at the anode causes complete failure of benthic microbial fuel cells. Typically, moorings rest on the bottom in uneven and unpredictable ways that provide many conduits for oxygen to reach the anode. Accordingly, an innovative technique is required to make a flexible seal around a mooring that can (1) cope with unevenness in the ocean bottom and (2) is not easily displaced by ocean currents.

A reliable, self-deploying technique for implementing an impermeable oxygen barrier at the seafloor interface would eliminate the need for diver and ROV assistance in deep ocean benthic microbial fuel cell-powered electronic systems. The remotely-deploying benthic microbial fuel cell described herein is the combination of a graphite anode mounted below an array of interlocking radially mounted asymmetric rubber "flukes" in a flower petal-like orientation, the collection of which is referred to as a "skirt." The flukes, respective to their neighbor, are overlapped to the previous and underlapped to the following. Shaped like an elongated dorsal fin, the flukes allow folding on multiple, non-parallel crease lines, allowing a single otherwise inelastic fluke to mimic compound curves. The collection of the compound curves around the skirt allows it to form to uneven ground, and the overlap forces a seals between flukes.

In some aspects of the invention, the flukes are formed from a flexible material suitable for use in a marine environment, such as natural or synthetic rubber. Silicone rubber, styrene-butadiene rubber (SBR), ethylene propylene diene monomer rubber (EPDM), neoprene rubber, general purpose rubber, and nitrile rubber are examples of materials that may be used to form the flukes. Other synthetic materials or plastics may be used so long as they are impermeable to oxygen and do not bio-degrade or corrode over the lifetime of the mooring. The flexibility of the fluke material is balanced against the need for sufficient rigidity to prevent the flukes from being pushed up by currents that could cause them to fail to maintain their deployed position, which could allow oxygenated water to reach the anode. Flukes that are unable to maintain the anoxic environment around the anode can result in failure of the benthic microbial fuel cell.

The flukes may be provided in any thickness that permits them to retain their flexibility and sturdiness when deployed on the bottom of a body of water. This thickness may vary depending on the specific material used to form the flukes. Exemplary fluke thicknesses that may be used in accordance with the invention include, but are not limited to, about 0.3 cm (about 0.125"), about 0.6 cm (about 0.25"), about 0.9 cm (about 0.375"), and about 1.3 cm (about 0.5").

The flukes are also not particularly limited in terms of their shape, so long as they are able to be securely folded against the shell when in the stored configuration, and provide sufficient overlap with adjacent flukes to create an anoxic environment around the anode, and prevent the anode from contacting the oxygenated water when in the deployed configuration. In one aspect, the flukes are configured as petals in which an outer edge approximately follows a semicircular arc, and an inner edge that is less curved than the outer edge. The inner edge of the fluke overlaps the outer edge of the adjacent fluke.

In other words, the multi-element "fluke skirt" and the radial asymmetry of the individual rubber flukes increases the ability of the skirt to form to a contoured bottom. By extending the outer edge of the fluke over a greater arc than the inside edge, the non-elastic rubber forms pseudo-compound curves that would not otherwise be possible in a single piece skirt, or a skirt made up of perfectly radially symmetric flaps. The overlap of the flukes force a deformed fluke to form a seal with the two neighboring flukes. Further, using general purpose rubber provides the required flexibility and sturdiness for the fluke functionality.

Referring now to FIG. 1, a cross section of a remotely-deploying benthic microbial fuel cell 100 is shown including, but not limited to, flukes 102, a shell 104, and a bottom-mounted anode 106. The flukes 102 are shown in a deployed position for when the microbial fuel cell 100 is sitting on a bottom of a body of water. The flukes 102 are mounted to the bottom of the shell 104 and overlap when deployed so that an anoxic chamber is created around the bottom-mounted anode 106. The shell 104 can house various devices (not shown) such as sensor devices, communication devices, batteries, etc., which are powered by the remotely-deploying benthic microbial fuel cell 100.

The bottom-mounted anode 106 is mounted at the bottom of the shell 104 so that the anode 106 can embed itself when the fuel cell 100 is dropped onto the bottom of a body of water. Electric potential results from oxidation of organic material in the sediment at the anode 106 and reduction of oxygen at the cathode (not shown). If a power-consuming device (e.g., various devices stored in the shell 104) is inserted into this circuit, an electrical current will flow from the anode 106 to the cathode. The anoxic chamber created by the flukes 106 prevents oxygenated water from reaching the anode 102 and creates an alternate electron pathway for the oxidation of organic material that does not include the remotely-deploying benthic microbial fuel cell circuit (i.e. a short circuit).

Figure 2A:
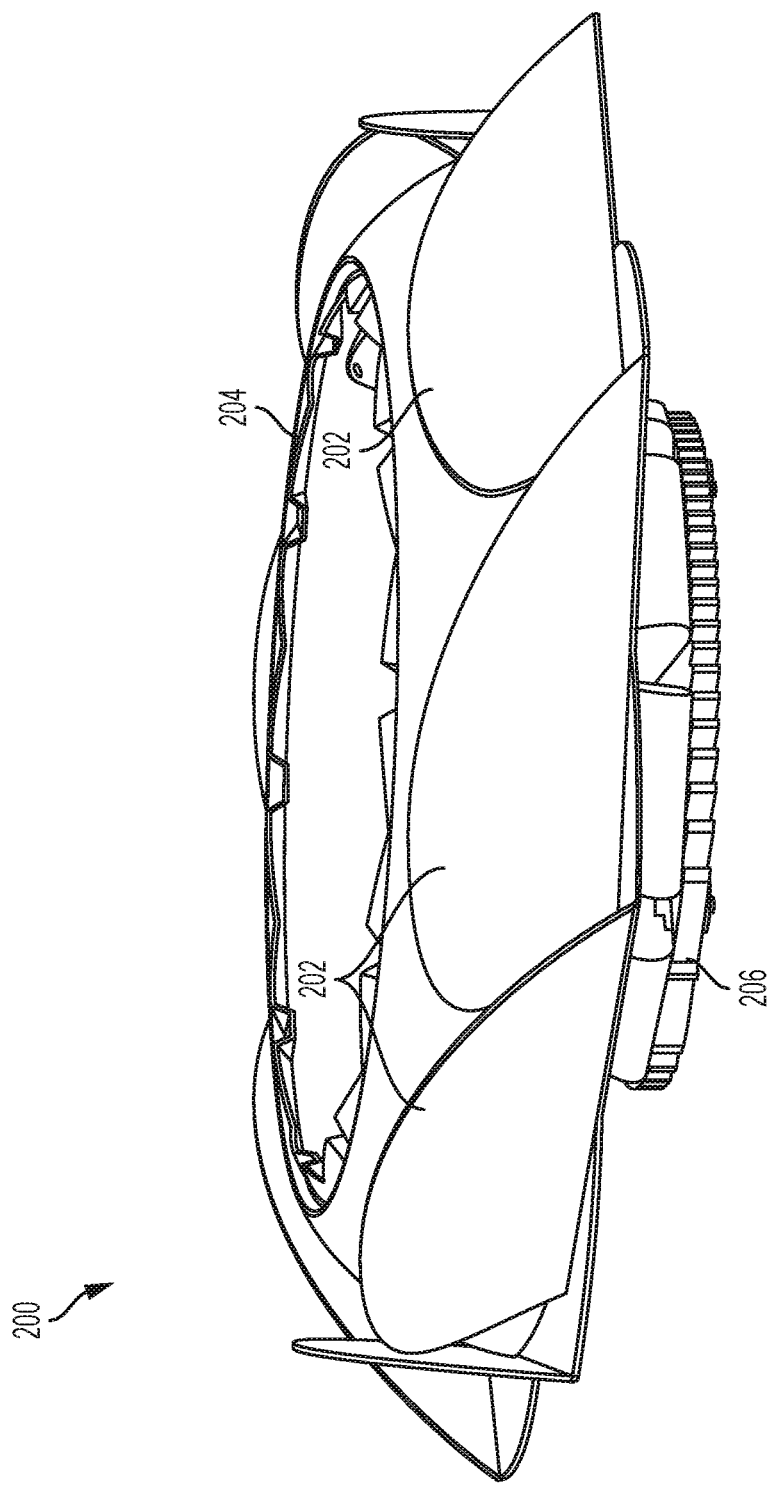
FIGS. 2A and 2B are side views of a bottom portion of an example remotely-deploying benthic microbial fuel cell.

FIG. 2A is a side view of a bottom portion of an example remotely-deploying benthic microbial fuel cell 200 that is in a stored configuration. The flukes 202 are raised in a "closed flower" formation to be adjacent to a side portion of the shell 204. The bottom-mounted anode 206 is exposed when the fuel cell 200 is in the stored configuration. The stored configuration of fuel cell 200 is used for during storage, transportation, and deployment of the fuel cell 200. The flukes 202 are arranged so that, once released, the flukes 202 fall into the deployed configuration shown in FIG. 2B.

Figure 2B:
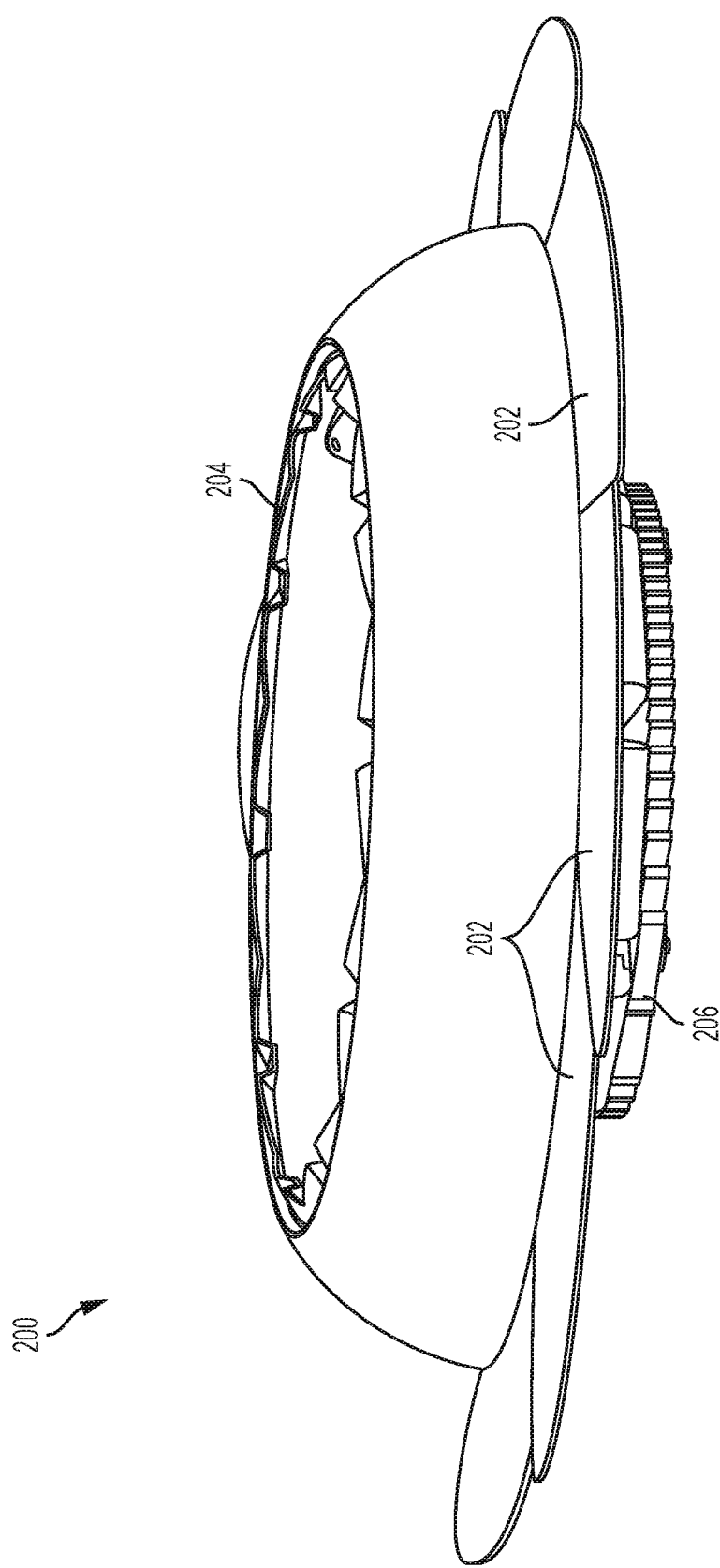

FIG. 2B is a side view of a bottom portion of an example remotely-deploying benthic microbial fuel cell 200 that is in a deployed configuration. After the fuel cell 200 is deployed, the flukes 202 are released and descend to the deployed position shown. In the deployed position, each fluke 202 overlaps its adjacent flukes 202 such that a sealed chamber is created against the bottom of a body of water. In the deployed configuration, the bottom-mounted anode 206 is protected from oxygenated water by the flukes 202. The fuel cell is not deployed with the flukes already in the deployed position as they would tangle and overlay each other in unpredictable ways upon contact with the bottom (i.e., the ocean floor), which would prevent formation of the required seals between the flukes.

Figure 3:
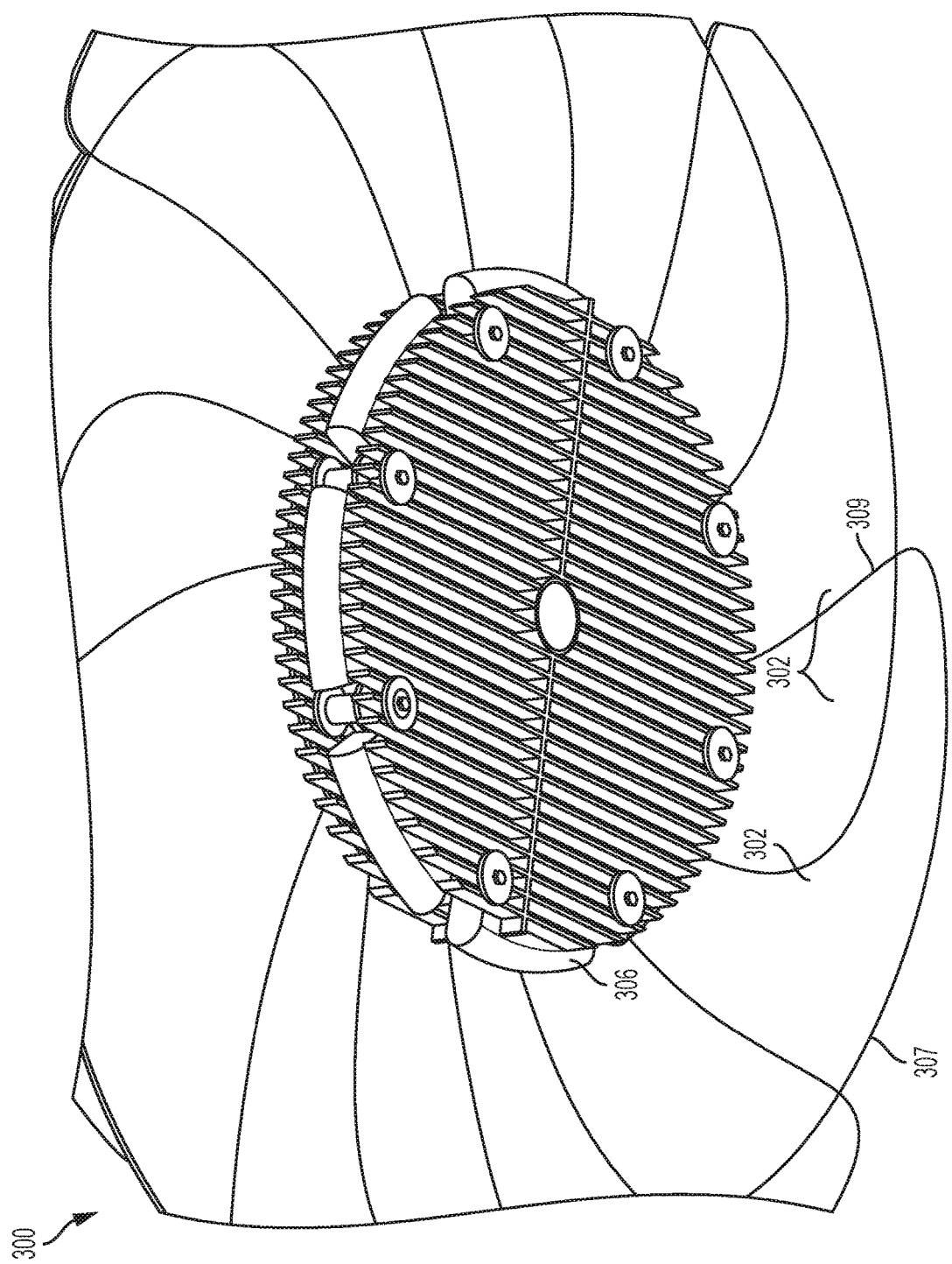
FIG. 3 is a bottom view of an example remotely-deploying benthic microbial fuel cell.

FIG. 3 is a bottom view of an example remotely-deploying benthic microbial fuel cell 300 in a deployed configuration. Each fluke 302 an outer edge 307 and an inner edge 309. The inner edge 309 of each fluke 302 is overlapped by the outer edge 307 of an adjacent fluke 302 to create a sealed, anoxic chamber on the bottom of the body of water. FIG. 3 shows eight flukes 302; however, any number of flukes 302 could be used to achieve similar results. The outer edge 307 of each fluke 302 approximately follows a semicircular arc, where the inner edge 309 approximately follows about half of the diameter of the semicircular arc. In other words, each fluke 302 is shaped somewhat like the dorsal fin of a dolphin.

The flukes 302 are mounted to the bottom of the shell (not shown), where the perimeter of the bottom-mounted anode 306 overlaps the fluke mountings. Thus, when the flukes 302 are deployed, the anoxic chamber is created around the bottom-mounted anode 306. The bottom-mounted anode 306 is a grating that can also include carbon fiber bottle brushes (not shown) to improve the performance of the anode 306. In this case, the carbon fiber bottle brushes can be formed into rings and mounted to the anode 306. When the fuel cell 300 is deployed, the carbon fiber bottle brushes embed into sediment on the bottom of the body of water.

The deployment of the remotely-deploying benthic microbial fuel cell of the invention is not to be considered limited to a particular release mechanism. Any release method and apparatus that lowers the mooring to the bottom of the body of water and detaches it from the vessel used to deploy it can be used in accordance with the invention, so long as it releases the flukes from the stored position to the deployed position.

Figure 4:
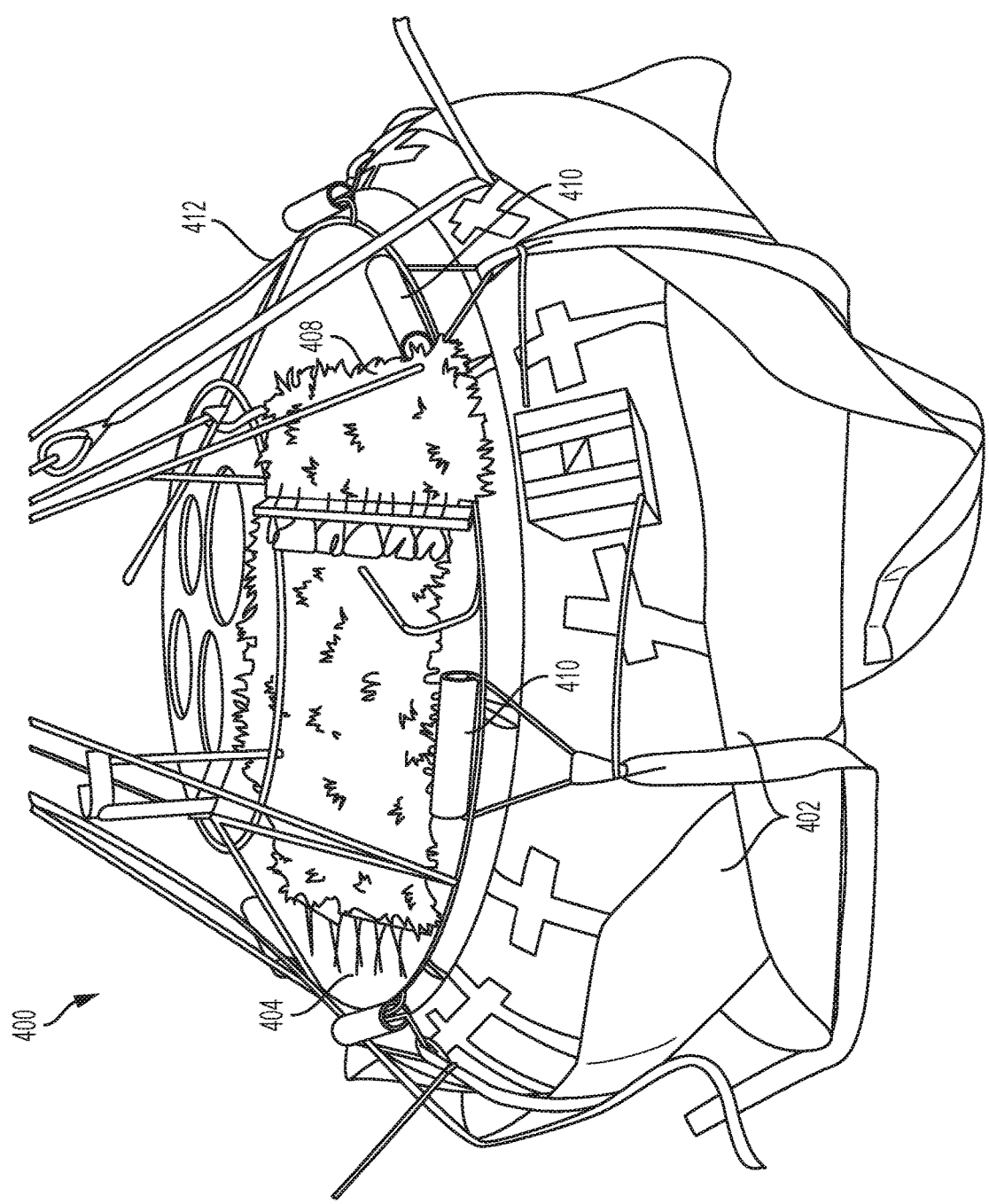
FIG. 4 is a first example of a remotely-deploying benthic microbial fuel cell.

FIG. 4 shows an example of a remotely-deploying benthic microbial fuel cell 400 that is in a stored configuration. The flukes 402 are held adjacent to the shell 404 by a deployment cage 412. In this example, the lower hoop of deployment cage 412 secures rollers 410 against the side portion of the base unit and holds the attached lines under tension, which in turn holds the plurality of flukes 402 in the stored position. In some aspects, the deployment cage includes a receiver to receive a signal, such as an acoustic signal, to release the deployment cage. Upon release of the deployment cage 412, the plurality of rollers 410 are no longer held in position against the base unit, and the plurality of rollers 410 roll along the side portion of the base unit, releasing the tension on the cables that hold up the flukes 402. This permits the plurality of flukes to move from the stored position to the deployed position.

Figure 5A:
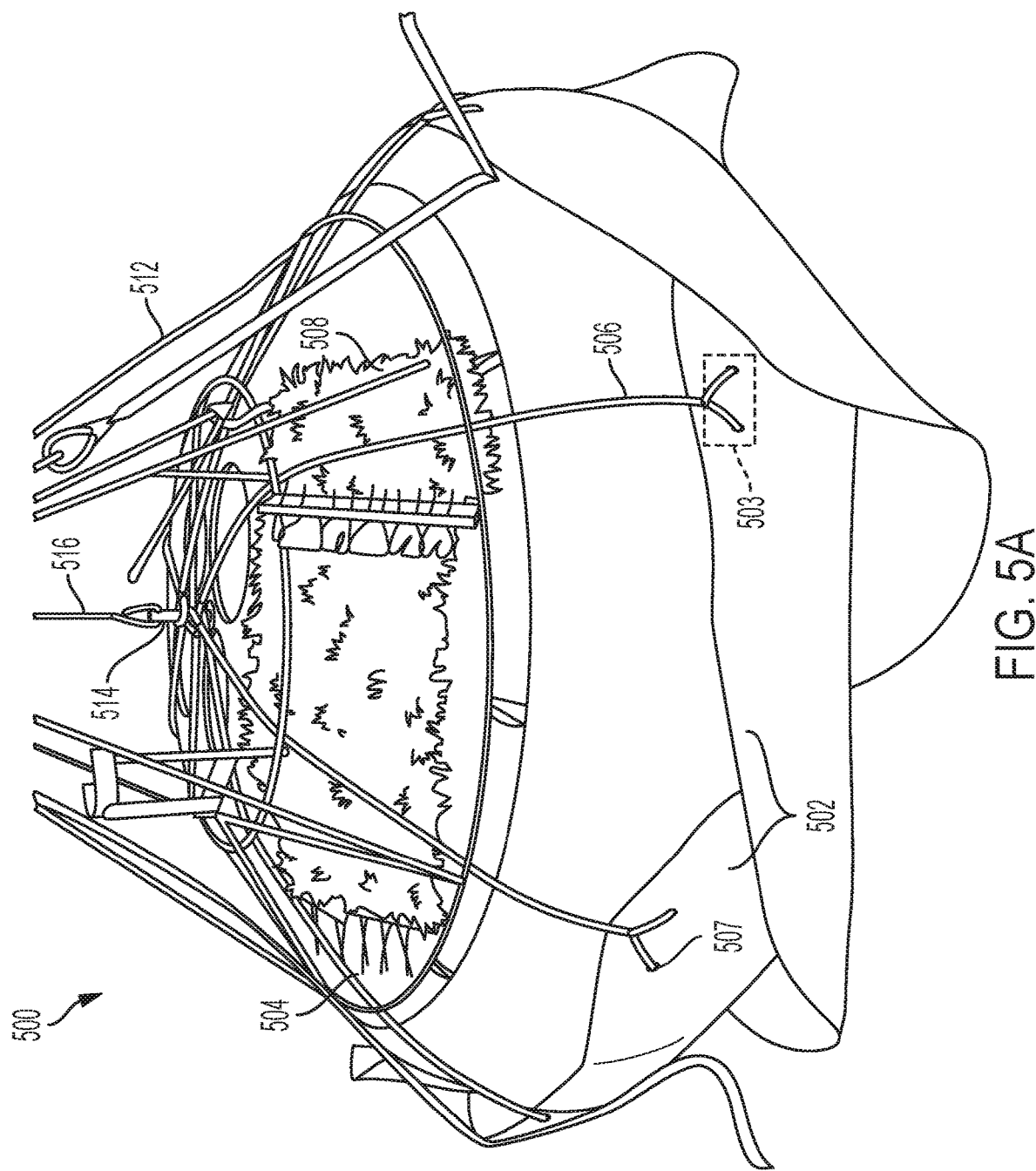
FIG. 5A is a second example of a remotely-deploying benthic microbial fuel cell.

FIG. 5A shows an alternative embodiment of a remotely-deploying benthic microbial fuel cell 500 that uses a deployment cage 512 that does not include rollers. In this embodiment, ropes 506 or other securing portions (i.e., lines, chains) are threaded through holes 507 cut in the flukes 502 and then looped around the top of a central belaying pin 514. An optional backing layer 503 may be provided to reinforce holes 507 in flukes 502, in order to prevent tearing due to the tension of the ropes. The ropes 506 hold the flukes 502 against the sides of the mooring until the deployment cage 512 is released. The release of the deployment cage 512 pulls the belaying pin 514 out of the mooring using pull 516, which may be a rope, line, chain, or other form of attachment. The flukes 502 then lay out on the bottom of the ocean floor and the deployment cage 512 and belaying pin 514 are raised back to the surface.

Figure 5C:
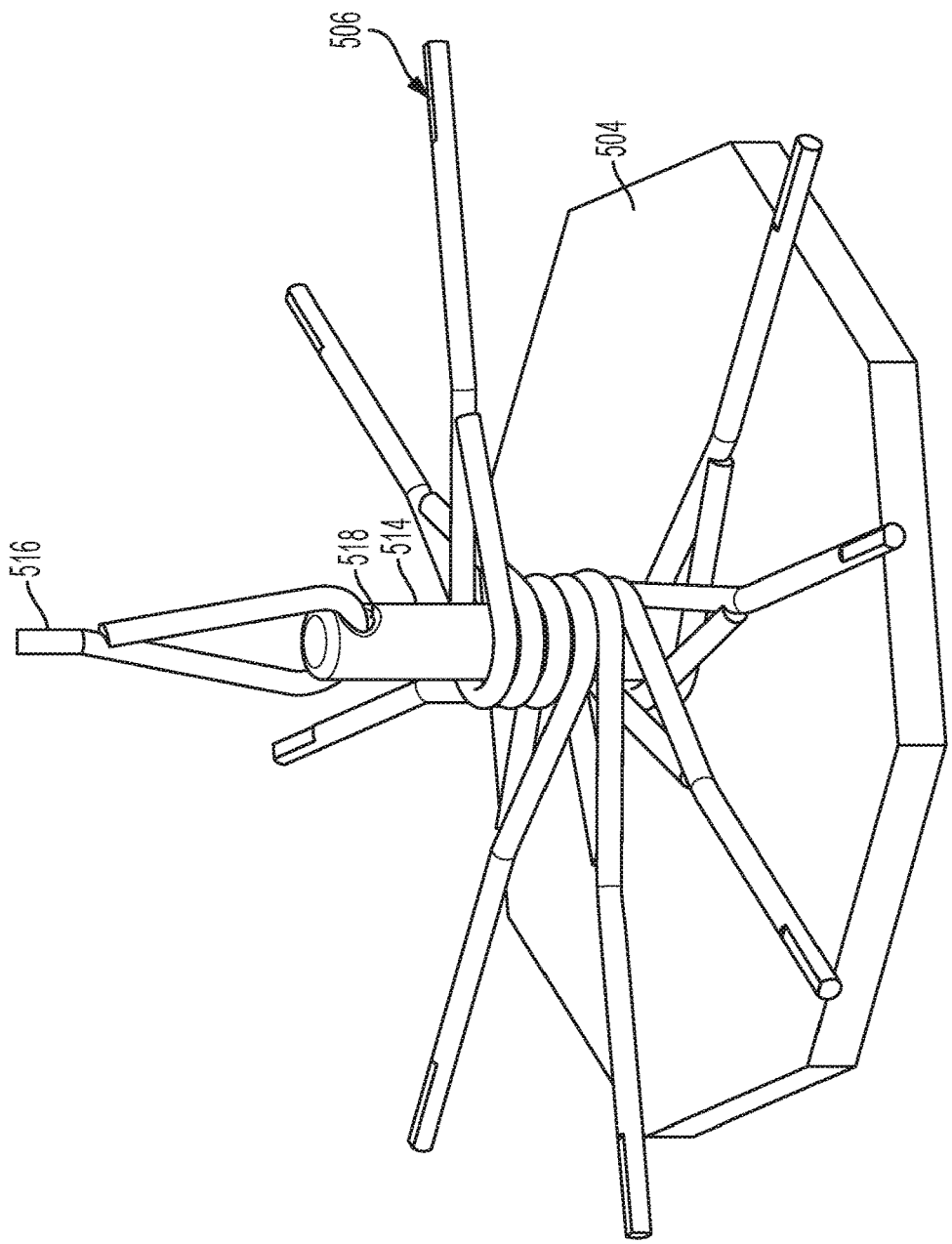
FIG. 5C depicts the arrangement of the lines and belaying pin prior to deployment of the benthic microbial fuel cell.
Figure 5B:
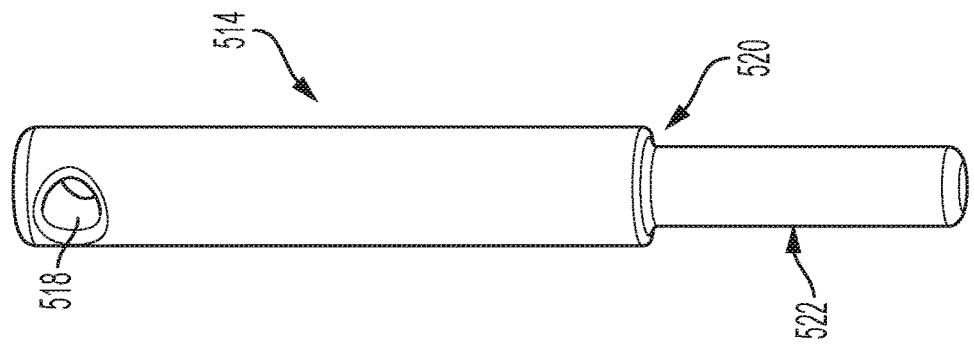
FIG. 5B depicts the belaying pin shown in FIG. 5A.

As shown in FIG. 5B, the belaying pin 514 has a hole 518 in the top portion thereof for securing pull 516 (not shown), which connects pin 514 to cage 512, preferably by tying or splicing to a solid member of the cage that is oriented roughly above pin 514. In addition, belaying pin 514 has a shoulder 520 that prevents belaying pin 514 from being pushed into a receiving hole (not shown) for belaying pin 514 that is provided in shell 504. Portion 522 of the belaying pin 514, which has a reduced diameter as compared to shoulder 520, is recessed into the receiving hole when the benthic microbial fuel cell 500 is in its stored configuration. Although belaying pin 514 may be constructed of any material suitable for use in an undersea environment, preferred materials are non-corroding metals, such as aluminum or titanium.

FIG. 5C shows the configuration of belaying pin 514 with lines 506 attached, and pull 516 attached through hole 518. By attaching lines 506 from flukes 502 around belaying pin 514, where lines 506 are supported by the body of shell 504 and prevented from sliding off of belaying pin 514, the flukes can be secured against the shell in the stored configuration. Lines 506 are preferably oriented in continuous sequence so that the loop of one fluke stacks above its neighbor on one side and below its neighbor on the other side. Belaying pin 514 relies on the support of the receiving hole (not shown) in the shell 504 to keep from torqueing sideways and having the loops slide off prior to deployment of the benthic microbial fuel cell. In operation, when the benthic microbial fuel cell 500 is deployed, deployment cage 512 is raised and causes attached pull 516 to pull belaying pin 514 up and out of the receiving hole (not shown). Once belaying pin 514 is removed from the receiving hole, ropes 506 are no longer secured around the belaying pin, allowing the flukes 502 to move the deployed position.

With respect to FIGS. 4 and 5A, fuel cell 400/500 includes a bottom anode (not shown) that comprises a plurality of carbon fiber bottlebrush electrodes that are formed into rings and mounted to a grating (such as grating 206 shown in FIG. 2). The grating may comprise a fiberglass disk. In one example, the fiberglass disk is approximately 1.2 meters in diameter. The fuel cell 400/500 further includes cathode 408/508 comprising a second plurality of carbon fiber bottlebrush electrodes that are attached to the top portion of the shell 404/504. The deployment cage 412/512 restrains the flukes 402/502 and the cathode 408/508 while the fuel cell 400/500 is in a stored configuration. In one aspect, the carbon fibers may be provided in a linear array, i.e., arranged in a bottle brush configuration. In some aspects, only one side of the cathode 408/508 is attached to the shell 404/504, so that the cathode 408/508 floats in oxygenated water when the fuel cell 400/500 is deployed. In other aspects, the cathode 408/508 may be strapped to the outside of the mooring shell 404/504.

Figure 6:
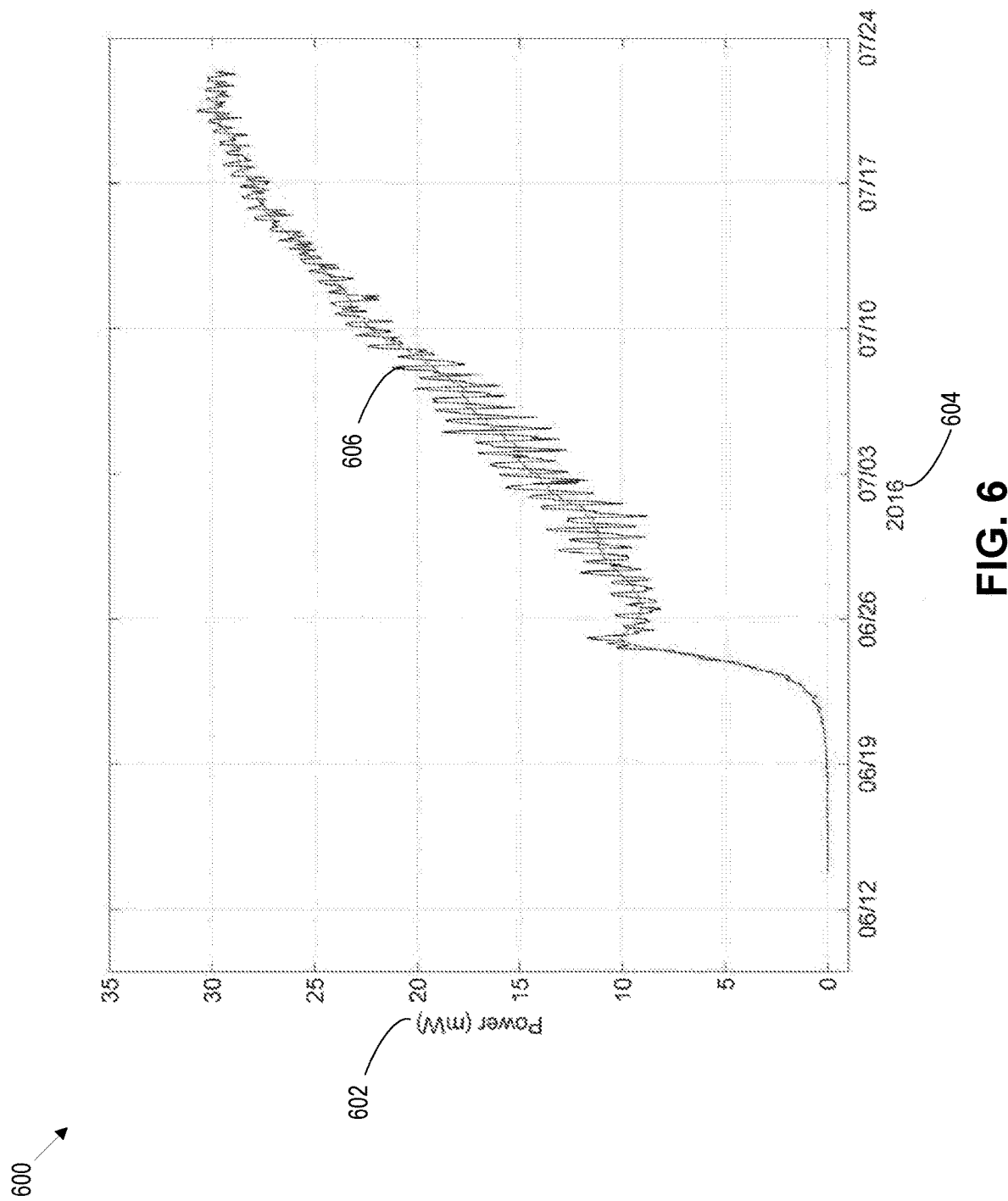
FIG. 6 is a graph showing the power produced during a test deployment of a remotely-deploying benthic microbial fuel cell.

FIG. 6 is a graph 600 showing the power produced 606 during a test deployment of an remotely-deploying benthic microbial fuel cell. The y-axis 602 shows power in milliwatts and the x-axis 604 shows time. The test deployment of the benthic microbial fuel cell as described herein was conducted in Maine's Damariscotta River estuary. During the test, the mooring was lowered to a bottom depth of seven meters and then the deployment cage was detached by acoustic command, releasing the rubber flukes and the floating cathode. Divers documented and verified the successful operation of the automatic deployment system. A Scribner model 871 electronic load tester was used to control a variable resistor between the anode and cathode and to record the current passing through this circuit every hour. The 871 control system automatically varied the load resistance to attempt to maintain a 0.35 volt potential between the anode and cathode and thus measure the amount of sustained power 606 that could be produced by this benthic microbial fuel cell.

Approximately 7 days after deployment, appreciable current began to flow through the benthic microbial fuel cell, and power production 606 rapidly increased over the next 4 days. Then power production 606 increased more gradually, reaching a maximum 24-hour-average power level of 30 milliwatts on day 38 after the deployment. The independent battery powering the 871 system failed on day 38, prematurely stopping the experiment 85 days early.

The benthic microbial fuel cell was fully functioning up until the 871 system failure. Oxygen was being excluded from reaching the anode, as the median oxygen level at the anode was measured as 0.09 mg/l by an optode oxygen sensor, while the corresponding median oxygen level measured at the floating cathode was 9.74 mg/l. The benthic microbial fuel cell produced a higher power per anode footprint surface area (26 mW/m$^2$) than a calibration plate benthic microbial fuel cell anode system deployed nearby (17 mW/m$^2$).

Figure 7A:
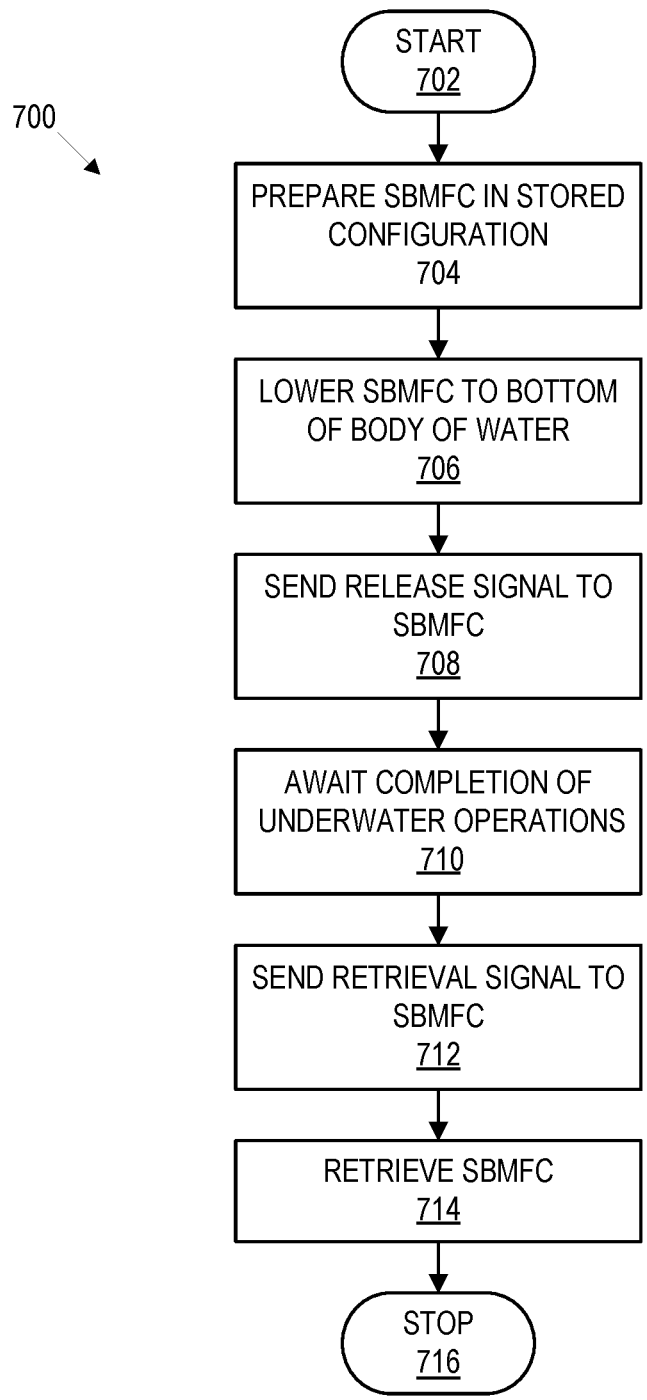
FIGS. 7A and 7B are flowcharts of an example method of operation of a remotely-deploying benthic microbial fuel cell.

FIG. 7A is a flowchart of an example method of deployment for a remotely-deploying benthic microbial fuel cell from the perspective of a water vessel. As is the case with the other processes described herein, various embodiments may not include all of the steps described below, may include additional steps, and may sequence the steps differently. Accordingly, the specific arrangement of steps shown in FIG. 7A should not be construed as limiting the scope of deploying a remotely-deploying benthic microbial fuel cell.

Workflow 700 starts at block 702 and then proceeds to block 704, where a remotely-deploying benthic microbial fuel cell is prepared in a stored configuration. For example, the stored configuration can be as described above with respect to FIGS. 2A, 4, and 5A. In the stored configuration, the skirt of flukes is folded up into a "closed flower" arrangement by suspending the individual tips from the release cage with, for example, four tensioned lines formed from a synthetic material that run underneath the mooring. The release cage is an apparatus that can include horizontally oriented hoops of decreasing diameter in a cone shaped making up a metal frame, with an acoustically triggered deep ocean rated release mechanism located at the pinnacle.

In one embodiment, a release system includes a plurality of lines (e.g., at least three lines) from the top of a release cage that run down and around metal bars or other attachment points embedded in the base of the benthic microbial fuel cell system, and then run upwards to the bottom of the release, holding the benthic microbial fuel cell system in place underneath the release cage. Roller tubes are trapped by the release cage's lowest hoop, where it presses against the top of the remotely-deploying benthic microbial fuel cell, and holds the synthetic lines under tension which in turn hold the flukes against the side of the remotely-deploying benthic microbial fuel cell. In another embodiment, the release system does not include roller tubes, and instead the acoustic release of the cage mechanically triggers the removal of a belaying pin that secures lines threaded through holes cut into the flukes.

In block 706, the remotely-deploying benthic microbial fuel cell is lowered to the bottom of a body of water. After the remotely-deploying benthic microbial fuel cell is lowered to the bottom, a release signal (e.g., acoustic signal) is sent to the remotely-deploying benthic microbial fuel cell in block 708. After the remotely-deploying benthic microbial fuel cell is released, the release cage and hoisting lines are then raised back to the surface. In block 710, completion of underwater operations by the remotely-deploying benthic microbial fuel cell is awaited. For example, the remotely-deploying benthic microbial fuel cell can be configured to collect data for a set duration of time.

After the underwater operations are completed, a retrieval signal is sent to the remotely-deploying benthic microbial fuel cell in block 712, which triggers the remotely-deploying benthic microbial fuel cell to release lines attached to flotation devices. In block 714, the remotely-deploying benthic microbial fuel cell is retrieved using the released lines.

Figure 7B:
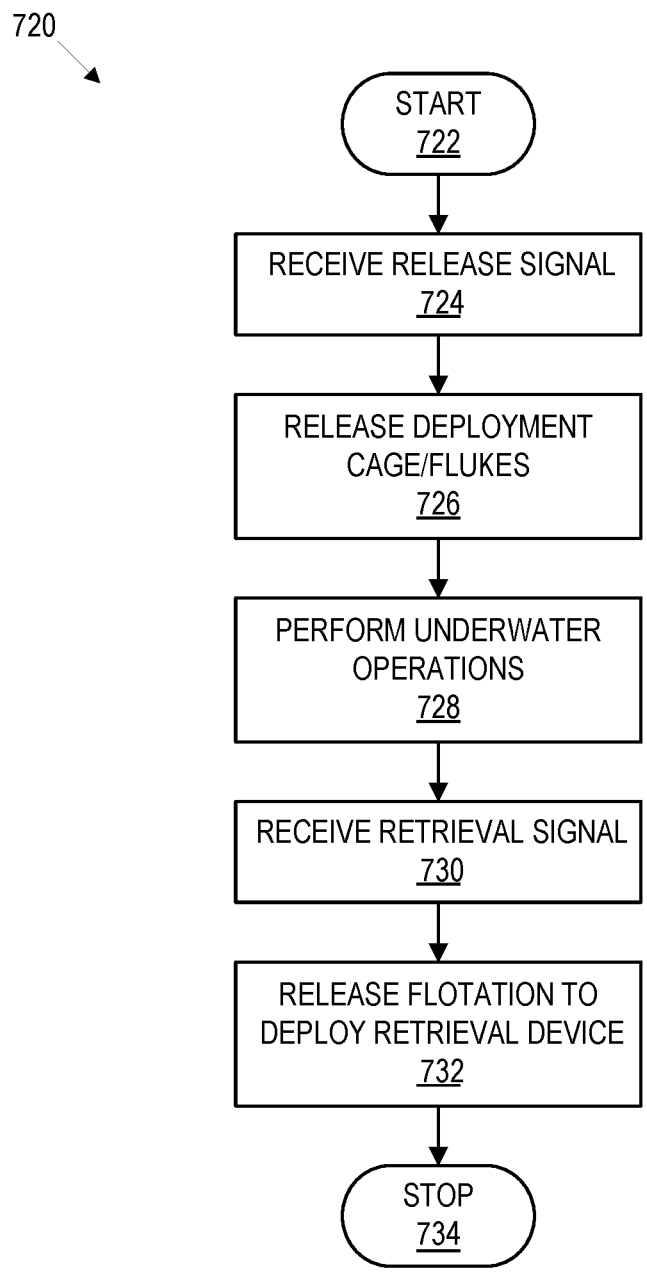

FIG. 7B is a flowchart of an example method of deployment from the perspective of the remotely-deploying benthic microbial fuel cell. As is the case with the other processes described herein, various embodiments may not include all of the steps described below, may include additional steps, and may sequence the steps differently. Accordingly, the specific arrangement of steps shown in FIG. 7B should not be construed as limiting the scope of deploying a remotely-deploying benthic microbial fuel cell.

Workflow 720 starts at block 722 and then proceeds to block 724, where remotely-deploying benthic microbial fuel cell receives a release signal. In response to the release signal, the remotely-deploying benthic microbial fuel cell is detached from the hoisting lines, the rollers are released to fall to the seafloor, and the flukes are allowed to lay out onto the seafloor in block 726. The deployed configuration of the flukes on the seafloor can be, for example, as described with respect to FIGS. 2B and 3, which show an anoxic chamber created by the flukes to protect the anode from oxygenated water.

In block 728, the remotely-deploying benthic microbial fuel cell performs underwater operations such as sensor data collection, bottom sampling, water sampling, etc. Initially, the current generated by the remotely-deploying benthic microbial fuel cell may be insufficient to power the devices used for the underwater operations. In this case, a battery can be used until a sufficient current is generated by the remotely-deploying benthic microbial fuel cell. After the underwater operations are completed, the remotely-deploying benthic microbial fuel cell receives a retrieval signal in block 732. In response to receiving the retrieval signal, the remotely-deploying benthic microbial fuel cell deploys flotation devices to deploy a retrieval device in block 734. A surface vessel can use the retrieval device to retrieve the remotely-deploying benthic microbial fuel cell from the bottom of the body of water.

Embodiments of the present teachings may involve computer systems for accomplishing portions of the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system is written in FORTRAN and C. The system can operate on a computer having a variable number of CPUs. Other alternative computer platforms can be used. The operating system can be, for example, but is not limited to, WINDOWS® or LINUX®.

The present embodiment can also include software for accomplishing portions of the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

While the invention has been described with respect to a certain presently-preferred embodiments, those skilled in the art, having benefit of this disclosure, will appreciate that other embodiments can be devised which do not depart from the scope of the invention as disclosed herein.

The invention claimed is:

1. A remotely-deployed bottom mooring comprising:
   a base unit;
   a plurality of flukes that are mounted to a perimeter of a bottom portion of the base unit,
      the plurality of flukes are preconfigured to automatically move from a stored position to a deployed position,
      each fluke of the plurality of flukes is adjacent to a side portion of the base unit when in the stored position, and
      each fluke of the plurality of flukes overlaps an adjacent fluke on a bottom of a body of water when in the deployed position;
   a benthic microbial fuel cell, further comprising:
      an anode that is mounted to the bottom portion of the base unit, the anode is:
         embedded in the bottom of the body of water when the self-embedded bottom mooring is deployed, and
         isolated from oxygenated water in an anoxic chamber by the plurality of flukes when in the deployed position;
      a cathode that is attached to the base unit outside the anoxic chamber, the cathode floating in the oxygenated water when the remotely-deployed bottom mooring is deployed; and
      at least one sensor device on a circuit between the anode and the cathode.

2. The remotely-deployed bottom mooring as in claim 1, wherein the anode comprises a first plurality of carbon fiber bottlebrush electrodes that are formed into rings and mounted to a grating.

3. The remotely-deployed bottom mooring as in claim 2, wherein the grating is a fiberglass disk.

4. The remotely-deployed bottom mooring as in claim 2, wherein the cathode comprises a second plurality of carbon fiber bottlebrush electrodes arranged in a linear array.

5. The remotely-deployed bottom mooring as in claim 1, wherein each of the plurality of flukes is rubber.

6. The remotely-deployed bottom mooring as in claim 1, wherein each fluke of the plurality of flukes comprises:
   an outer edge that approximately follows a semicircular arc, and
   an inner edge that is less curved than the outer edge, wherein the inner edge of the fluke overlaps the outer edge of the adjacent fluke.

7. The remotely-deployed bottom mooring as in claim 1, further comprising a deployment system to hold the plurality of flukes in the stored position, the deployment system comprising a receiver to acoustically release the deployment system so that the plurality of flukes are moved from the stored position to the deployed position.

8. The remotely-deployed bottom mooring as in claim 7, wherein the deployment system comprises a plurality of rollers that are pinned against the side portion of the base unit when the plurality of flukes are in the stored position, the plurality of rollers rolling along the side portion when the plurality of flukes are moved from the stored position to the deployed position.

9. The remotely-deployed bottom mooring as in claim 7, wherein the deployment system comprises ropes threaded through holes in the flukes and looped around a central belaying pin, holding the plurality of flukes against the side portion of the base unit when in the stored position, the central belaying pin releasing the ropes when the plurality of flukes are moved from the stored position to the deployed position.

10. A method for deploying a benthic microbial fuel cell comprising:
    positioning a plurality of flukes of a remotely-deployed benthic microbial fuel cell in a stored position, wherein each fluke of the plurality of flukes is adjacent to a base unit of the remotely-deployed benthic microbial fuel cell when in the stored position;
    lowering the remotely-deployed benthic microbial fuel cell to a bottom of a body of water;
    sending a release signal to the remotely-deployed benthic microbial fuel cell, wherein in response to the release signal, the remotely-deployed benthic microbial fuel cell moves from the stored position to a deployed position, and wherein each fluke of the plurality of flukes overlaps an adjacent fluke on the bottom of the body of water when in the deployed position; and
    performing underwater operations with current generated by the benthic microbial fuel cell, wherein an anode of the benthic microbial fuel cell is isolated from oxygenated water by the plurality of flukes when in the deployed position.

11. The method of claim 10, further comprising:
    sending a retrieval signal to the remotely-deployed benthic microbial fuel cell, wherein in response to the retrieval signal, the remotely-deployed benthic microbial fuel cell deploys a flotation device for raising a retrieval device to a surface of the body of water; and
    using the retrieval device to retrieve the remotely-deployed benthic microbial fuel cell from the bottom of the body of water.

* * * * *